United States Patent [19]

Hackett

[11] 4,043,686
[45] Aug. 23, 1977

[54] STABILIZED BALL JOINT

[75] Inventor: Kenneth R. Hackett, Boulder, Colo.

[73] Assignee: Snotrix Division of Pittway Corporation, Boulder, Colo.

[21] Appl. No.: 692,593

[22] Filed: June 3, 1976

[51] Int. Cl.$^2$ ............................................. F16C 11/06
[52] U.S. Cl. ..................................... 403/90; 403/114; 403/131; 248/181; 248/288 B; 285/268; 285/DIG. 8
[58] Field of Search ................. 403/90, 114, 115, 122, 403/144, 128, 131; 248/181, 178, 288 B; 285/DIG. 8, 268, 160

[56] References Cited

U.S. PATENT DOCUMENTS

| 658,911 | 10/1900 | Hall | 248/181 |
| 1,697,037 | 1/1929 | Witz | 403/114 X |
| 2,041,847 | 5/1936 | Marchand | 285/DIG. 8 |
| 3,747,884 | 7/1973 | Lutz et al. | 248/181 |

FOREIGN PATENT DOCUMENTS 1,043,363  9/1966  United Kingdom ............... 403/90

Primary Examiner—Andrew V. Kundrat
Attorney, Agent, or Firm—Max L. Wymore

[57] ABSTRACT

A ball joint for support of and orientation of a device in any direction stabilized against rotation on its own axis including means locking the ball in a selected position.

3 Claims, 8 Drawing Figures

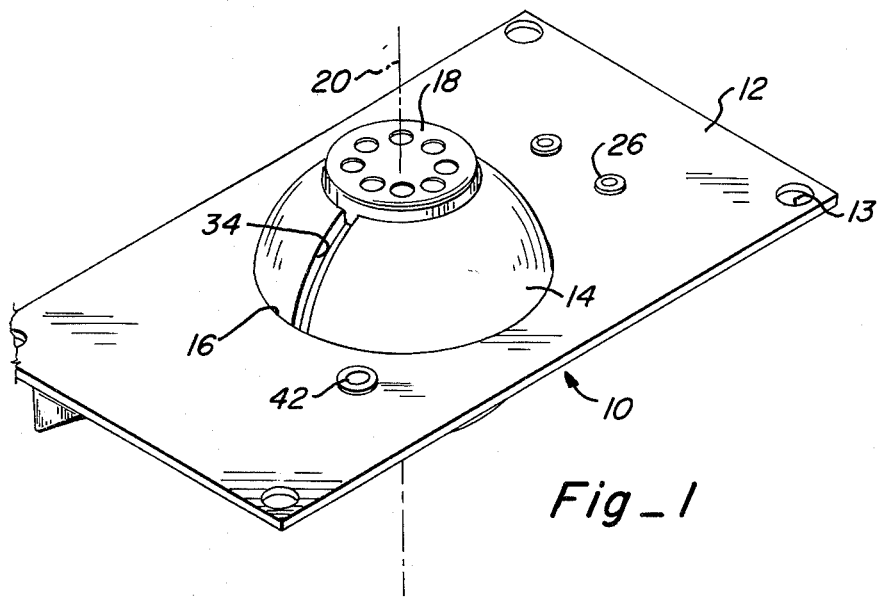
Fig_1
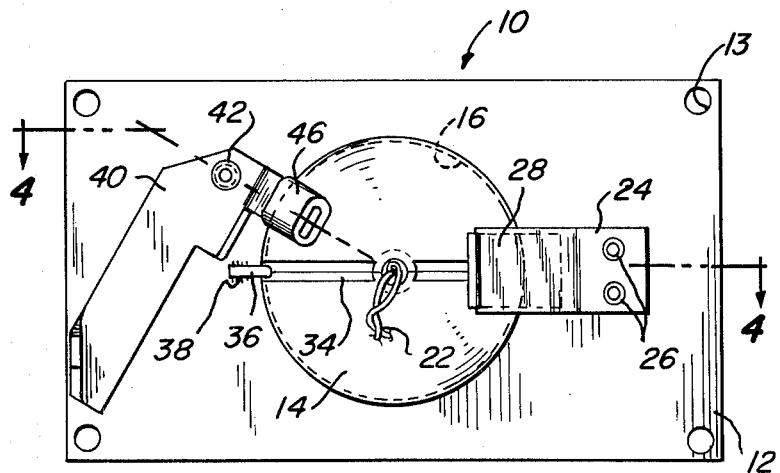
Fig_2
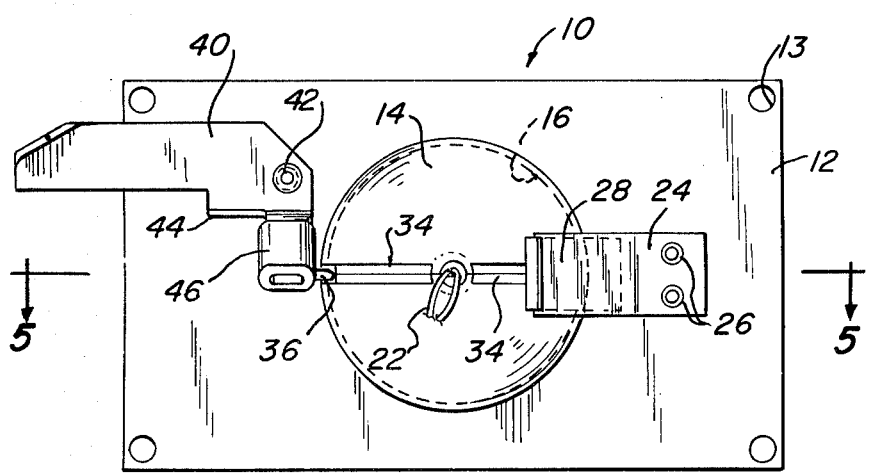
Fig_3

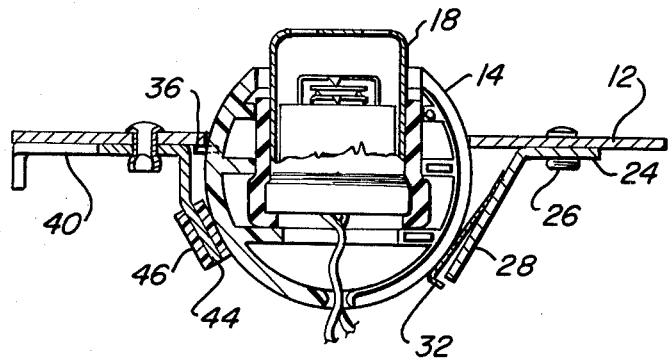
Fig_4
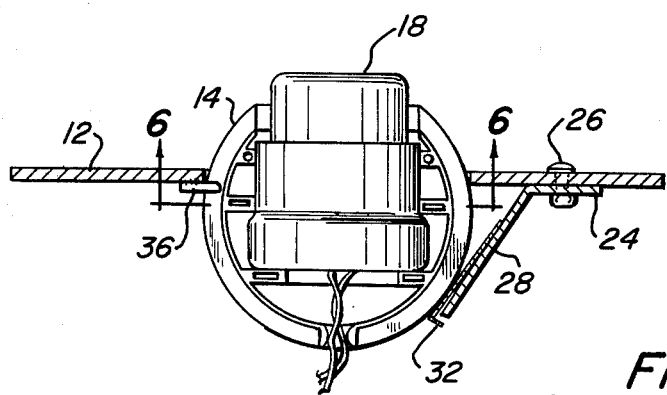
Fig_5
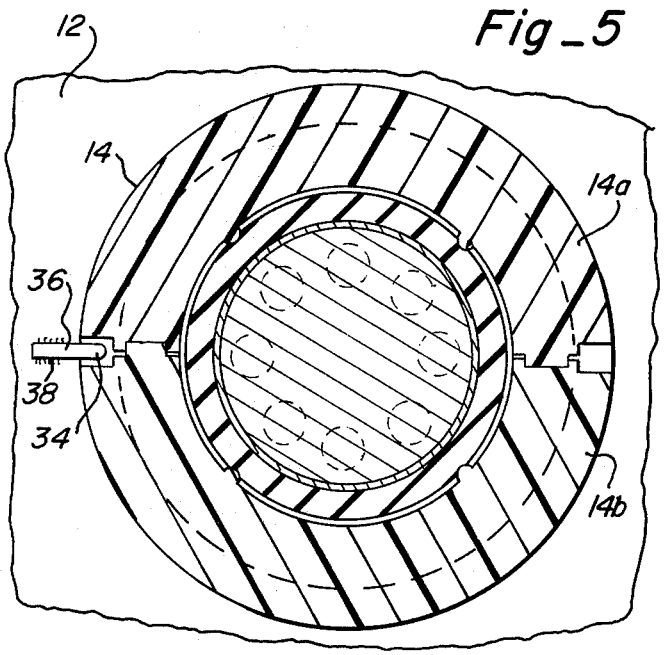
Fig_6
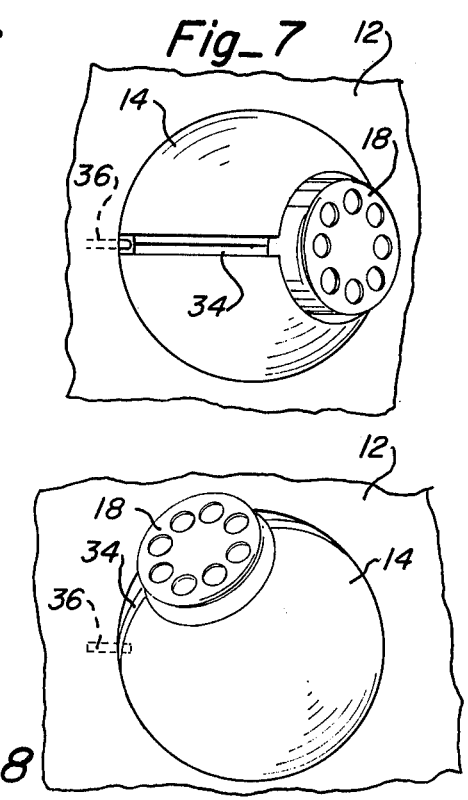
Fig_7
Fig_8

STABILIZED BALL JOINT

A ball joint mounting can be very useful as a support for many devices, such as optical systems, microwave antenna, ultrasonic transducer, a joystick and the like in order to orient the device in any direction. When these devices are so mounted, they usually are connected by leads or wires to some fixed point. In the case of an optical system, the connection may be by means of a bundle of optical fibers. A ball joint in addition to permitting its axis to be oriented in any direction, is also free to rotate on its axis. Rotation of a ball joint on its axis will result in the twisting and ultimate failure of any leads or external connections.

It is an object of this invention to provide a ball joint that allows complete freedom of movement except rotation about its own axis.

It is a further object of the present invention to provide a ball joint arrangement including means for immobilizing the ball in a predetermined selected position.

It is a further object of the invention to provide a ball joint that is economical of construction, sturdy and having exceptional serviceability.

The foregoing features and advantages of the invention will become more apparent from the detailed description hereinafter considered in conjunction with the accompanying drawings wherein:

FIG. 1 shows an isometric view of the ball joint according to a preferred embodiment of the invention;

FIG. 2 is a bottom plan view of the ball joint arrangement in locked position;

FIG. 3 is a bottom plan view of the ball joint arrangement in unlocked position;

FIG. 4 is a view along line 4—4 of FIG. 2;

FIG. 5 is a view along line 5—5 of FIG. 3;

FIG. 6 is a view along line 6—6 of FIG. 5;

FIG. 7 is a top plan view of the ball joint rotated to one selected position; and, FIG. 8 is a top plan view of the ball joint rotated to another selected position.

Referring now to the drawings and in particular FIGS. 1-5, there is shown a ball joint 10 according to the present invention having a base plate 12 and a rotatable element 14. The base plate 12 is shown as being rectangular with a portion broken away; however, the base plate may be of any desired shape or size and with mounting holes 13 if desired. The rotatable element or ball 14 is in the shape of a spherical ball and the base plate 12 is provided with a circular opening 16 having a diameter just slightly less than the maximum or equatorial diameter of the ball 14. The ball is inserted into the opening from beneath the base plate and is prevented from passing therethrough due to the larger diameter. The device to be oriented in this instance is shown as an ultrasonic transducer 18 mounted concentric with the principal axis 20 of the ball. The principal axis is defined as that axis about which the revolution of the ball is constrained to avoid twisting of leads 22 that exit the opposite side of the ball from the transducer 18 and positioned coaxially with the principal axis 20, with the transducer 18 being located at what may be termed the north pole and the leads 22 being located at what may be termed the south pole. A spring holder 24 is mounted on the base plate 12 to one side of the opening and secured thereto as by means of rivets 26. The spring holder has a depending portion 28 inclined away from base plate 12 as it progresses toward the opening 16, see FIGS. 4 and 5, and positioned to just permit passage of the ball 14 to be received partially within opening 16. Portion 28 of the spring holder has attached to the upper portion thereof, as by spot welds 30 or the like, a flat spring 32 adapted to be biased against the ball and retain same within the opening 16 for movement.

The ball 14 is provided with a groove 34 which runs essentially from the north pole to the south pole along a meridian. A pin 36 is mounted on the base plate 12 to project radially into opening 16 and engages the groove 34. Pin 36 prevents the ball 14 from rotating on its principal axis but still permits the axis to be freely oriented. Only a single pin 36 may be used. Pin 36 may be tacked or spot welded to the base plate as at 38. If any more than a single pin were used in more than a single groove, the principal axis would not be able to swivel. As best seen in FIGS. 4, 5 and 6, the device illustrated in this invention to be oriented is an ultrasonic transducer 18. The transducer is supported by ball 14 by assemblying two hemispheres 14a and 14b about the transducer assembly. Since the ball 14 is formed by identical hemispheres, a groove is formed on each side of the ball on the 0° and 180° meridians; however, the pin 36 is received in the groove on one side only.

As best seen from FIGS. 2, 3 and 4, the spring holder 24 is positioned with respect to the opening 16 to permit the ball to pass therebetween and the opening to be received in the opening. Spring 32 is positioned on spring holder 24 in such manner to permit ball 14 to pass but upon the ball 14 being received in the opening 16, the spring biases the ball into the hole to permit movement thereof about all but its principal axis 20. To the opposite side of the opening 16 from spring mount 24 is positioned a pivotally mounted arm 40 pivoted on a rivet or the like 42. The end of the arm 40 immediately adjacent the ball is provided with a downwardly-dependent finger 44, the lower extremity of which is provided with a sleeve 46 of resilient material such as rubber and the like. With the pivotally mounted arm 40 in the locked position as seen in FIGS. 2 and 4, the sleeve 46 of resilient material is forced against the side of ball 14 and the ball 14 in turn is forced against the opening 16 and the bias spring 32 such as to immobilize the ball against movement. When the arm 40 is pivoted to the unlocked position as seen in FIG. 3, the ball is free to move in all degrees of freedom except rotation about its principal axis 20.

Thus, applicant has provided a ball joint assembly adapted to provide movement thereof and a device supported thereby in all degrees of freedom except rotation about its principal axis with locking means for positively locking the ball and device supported thereby in a selected position.

While I have shown and described a preferred embodiment of the invention, it will be readily apparent to those skilled in the art that there are a multitude of changes, improvements and modifications which may be made therein without departure from the spirit and scope thereof.

What is claimed is:

1. A ball joint mounting for a device to be selectively positioned and immobilized which comprises:
   a base plate having a circular opening therein;
   ball means positioned in said opening and having means for supporting a device thereon said ball being of a diameter enough larger than the opening to be retained thereby;
   bias means attached to the base plate urging said ball means into said opening; and, locking means pivotally mounted on said base plate and having a depending finger adapted to be pivotally moved into engagement with said ball means to lock said ball means against movement therebetween and said opening wherein said finger of said locking means is provided with resilient elastomeric means engaging said ball.

2. The mounting according to claim 1 wherein said ball is provided with a groove therein positioned along a meridian and said base plate is provided with protuberance means extending radially into the circular opening and being received within the groove in the ball to permit movement thereof while restraining rotation thereof about a major axis.

3. The mounting according to claim 2, wherein said bias means comprises spring means attached in depending relation to the base plate adjacent to the circular opening receiving said ball and is adapted to bear against the ball when within said opening.

* * * * *